United States Patent [19]

Hedberg et al.

[11] Patent Number: 5,261,059
[45] Date of Patent: Nov. 9, 1993

[54] CROSSBAR INTERFACE FOR DATA COMMUNICATION NETWORK

[75] Inventors: William F. Hedberg; Martin G. Halvorson; Donald B. Ellsworth, Jr.; Richard E. Lewis; Paul T. Brooks; Gary H. Mendelsohn, all of Albuquerque, N. Mex.

[73] Assignee: Digital Equipment Corporation, Maynard, Mass.

[21] Appl. No.: 547,831

[22] Filed: Jun. 29, 1990

[51] Int. Cl.⁵ .......................................... G06F 13/14
[52] U.S. Cl. ................... 395/325; 364/DIG. 1; 364/229.5; 364/239.51; 364/241.9; 364/244.8; 364/284.1
[58] Field of Search ................ 395/200, 250, 325; 370/94.1, 110.1

[56] References Cited

U.S. PATENT DOCUMENTS

| | | | |
|---|---|---|---|
| 4,456,991 | 6/1984 | Chea et al. | 370/58 |
| 4,499,461 | 2/1985 | Schneider | 340/825.03 |
| 4,695,999 | 9/1987 | Lebizay | 370/58 |
| 4,821,258 | 4/1989 | Fraser | 370/60 |
| 4,839,791 | 6/1989 | Ito | 395/250 |
| 4,845,710 | 7/1989 | Nakamura et al. | 370/110.1 |
| 4,849,968 | 7/1989 | Turner | 370/94 |
| 4,864,495 | 9/1989 | Inaba | 395/250 |
| 4,870,566 | 9/1989 | Cooper et al. | 395/325 |
| 4,968,977 | 11/1990 | Chinnaswamy et al. | 340/825.8 |
| 4,993,025 | 2/1991 | Vesel et al. | 370/94.1 |

OTHER PUBLICATIONS

"High-Performance Parallel Interface" Protocol Specification, American National Standard for Information Systems, Nov. 1, '89, pp. 1-30.

Primary Examiner—Debra A. Chun
Attorney, Agent, or Firm—Arnold, White & Durkee

[57] ABSTRACT

An interface between a host computer and a crossbar switch is provided which employs data buffering using multiple-port RAM devices. The receive and transmit data is clocked into or out of separate serial ports of the RAM, and at the same time a local processor can access the RAM by a random access port, asynchronous to the serial ports, to execute the protocol. The order of storing bursts of data in the multiple-port RAM is defined by a free buffer manager which keeps account of which locations are free. The addresses of these locations are moved to a received list after being used for incoming packets. After the protocol processor has finished with its tasks, these addresses, referred to as burst data descriptors, are moved to a transmit list to await loading of burst data back to the serial registers for clocking out, then when transmitted the descriptors are again entered into the free buffer manager.

41 Claims, 6 Drawing Sheets

CROSSBAR INTERFACE FOR DATA COMMUNICATION NETWORK

BACKGROUND OF THE INVENTION

This invention relates to data communication systems, and more particularly to a buffer memory and a method of operating a buffer memory in an interface between a host computer and a crossbar switch.

When a number of high-performance processor nodes are to be interconnected to form a network, one of the alternatives is the use of direct connection, as by crossbar switching apparatus. The crossbar switch functions to make physical connections between processor nodes, based upon destination address information sent by a source node in the beginning of a data packet. An interface is usually interposed between each of the host computer nodes and the crossbar switch to provide buffering and to execute a protocol, so the host is relieved of the task of executing the protocol and so that asynchronous transmission and reception of data is allowed. Usually the interface employs transmit and receive FIFOs and a global buffer memory. Data received from a transmission channel is stored in the receive FIFO and later transferred to the global buffer memory for protocol processing, then, after protocol processing, the data is transferred to another FIFO for transmission by the interface circuit to the crossbar or host computer.

The prior interface arrangements for buffering data in high-performance interconnect systems have been limited in throughput, imposing delays in transmitting data at the rates sometimes needed in the highest performance levels. For example, a parallel interface standard is being established which transmits data at 800-Mbps on a 32-bit parallel channel, or at 1600-Mbps on a 64-bit parallel channel; this is referred to as the High-Performance Parallel Interface (HIPPI) standard proposed by American National Standard for Information Systems (ANSI). The HIPPI standard is intended as the physical layer of a simplex high-performance point-to-point interface for transmitting digital data at these high peak data rates between data processing equipment, using 32-bit parallel twisted-pair copper cabling at distances up to 25 meters. The purpose of this parallel interface standard is to provide information exchange meeting the following criteria: content independence, in that the operation is not affected by the contents of information transfers; timing independence, in that the control is not dependent upon timing-critical operation in the upper-layer protocols; and flow control, in that the signal sequences provide look-ahead flow control to allow the average data rate to approach the peak data rate, even over distances longer than that nominally specified. Characteristics of the HIPPI standard include: point-to-point connections using one or two copper twisted-pair cabling; a simplex interface, capable of transfer in one direction only, with two of the interfaces being used to implement a full-duplex interface; data transfers performed and flow-controlled in increments of burst; simple signalling and control sequences with look-ahead flow control; support for low-latency, real-time and variable sized packet transfers; use in a circuit-switched environment is allowed, supported by a limited information field for subdevice addressing, one round-trip delay being required to establish or terminate a connection; multiple packets allowed after a connection is established, with no added delay between packets.

While the high-performance parallel interface standard provides the potential for information transfers between high-speed data processing equipment at very advanced quantitative levels, the burden placed upon the host equipment is substantial. An interface is needed to off-load protocol-related functions from the host computer. In addition to buffering large amounts of data, the interface must be able to execute protocols at various levels, and so relatively unrestricted access to the buffered data in the interface is a necessity.

An ideal crossbar network would act as an "intelligent multiplexer". It would add zero latency to packet transmission, zero latency in making connections, predict data errors and not transmit damaged blocks or maybe correct damaged data "on the fly" (using EEC). It would also adapt instantly to network reconfigurations. Since this ideal is not attainable, the object is to minimize the latency of each component in the network.

SUMMARY OF THE INVENTION

In accordance with one embodiment of the invention, an improved method and equipment for use in executing the high-performance parallel interface (HIPPI) is provided. This method and equipment provides an interface which off-loads from the host computers functions such as routing, security checking, and error detection and correction, so the host computers are not burdened by these communications-related functions and thus the communication overhead is reduced. The host-to-host communication function is thus borne more by the interface than the hosts. Instead of two high-performance machines (computers) engaged in the task of communicating with one another, the machines are more able to devote the time otherwise needed for the communication function to their computational tasks instead.

In a particular embodiment of the invention, an interface between a host computer and a crossbar switch is provided which employs data buffering using three-port RAM devices. The receive and transmit data is clocked into or out of separate serial ports of the RAM, and at the same time a local processor can access the RAM by a random access port, asynchronous to the serial ports, to execute the protocol and to do the functions such as routing, security checking, error detection and correction, etc., as mentioned above. The order of storing bursts of data in the multiple-port RAM is defined by a free buffer manager which keeps account of which locations are free. The addresses of these locations are moved to a received list after being used for incoming packets. After the protocol processor has finished with its tasks, these addresses, referred to as burst buffer descriptors, are moved to a transmit list to await loading of burst data back to the serial registers for clocking out, then when transmitted the descriptors are again entered into the free buffer manager.

The buffer memory and its memory management scheme used in the example embodiment provides efficient use of the buffer memory. Data reception, retransmission and protocol interrogation activities converge on the buffer memory as the three masters (protocol processor, input channel, output channel) contend for this common resource. The crossbar interface minimizes latency in servicing the channel controllers while maximizing buffer memory availability to the protocol processor. The combination of a triple-port RAM and the free buffer manager provides an architecture which is extensible and reduces complexity.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DETAILED DESCRIPTION OF SPECIFIC EMBODIMENT

Figure 1:
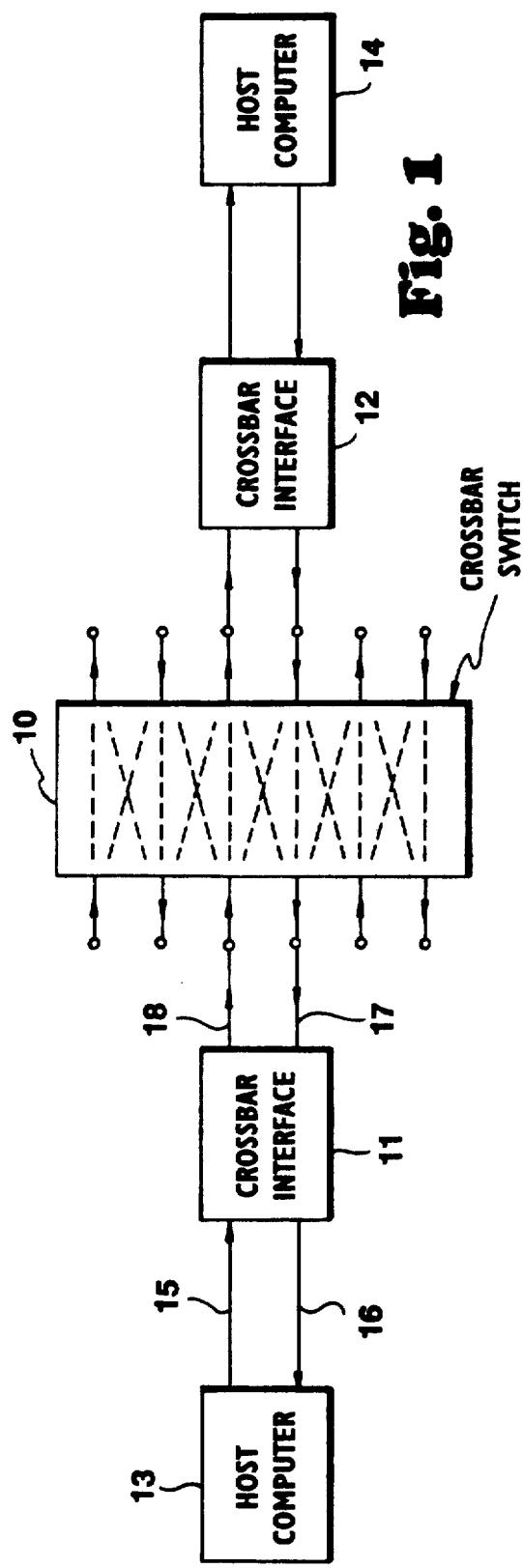
FIG. 1 is an electrical diagram in block form of a data communication system which may employ features of one embodiment of the invention.

Referring to FIG. 1, a communications network is illustrated which may employ features of the invention. This network uses a crossbar switch 10 for making direct connections between host computer nodes. A crossbar interface 11 or 12 connects a port of the crossbar switch 10 with a host computer 13 or 14. Each crossbar interface 11 or 12 has four ports, including one channel consisting of a receive path 15 from the host computer and a transmit path 16 going to the host computer, and another channel consisting of a receive path 17 from the crossbar switch 10 and a transmit path 18 going to the crossbar switch 10. The crossbar switch 10 functions merely to establish an interconnection between one of its input ports and one of its output ports based upon address information contained in packets sent from a host computer via its crossbar interface 11 or 12, according to a network protocol being used. The crossbar switch 10 may have a large number of the input paths 18 and output paths 17, for example thirty-two sets, and crossbar switches can be linked together to provide a very large number of potential connections; only a representative few are shown for simplicity. Each one of the host computers 13 or 14 may be mainframe computer system of high capacity and performance, or may be a workstation or terminal, or a computer having multiple terminals connected to it, or a disk storage facility, or any type of digital data processing equipment. Alternatively, the host computers may include processors or concentrators which are handling voice or video information in digitized form.

Each one of the four paths 15-18 in an example embodiment of the invention is a 32-bit parallel path constructed according to the High-Performance Parallel Interface (HIPPI) standard proposed by American National Standard for Information Systems (ANSI), as discussed above. This parallel interface has a capability of 800-Mbps, and a companion standard interface using a 64-bit parallel data path has a capability of 1600-Mbps. These levels of capability are used in installations having very high performance "supercomputer" type of computing equipment such as provided by the Cray computer. While the example embodiment is based upon 32-bit data paths employing parallel wire cable connectors for the paths 15-18, a fibre optic connection could also be used.

Figure 2:
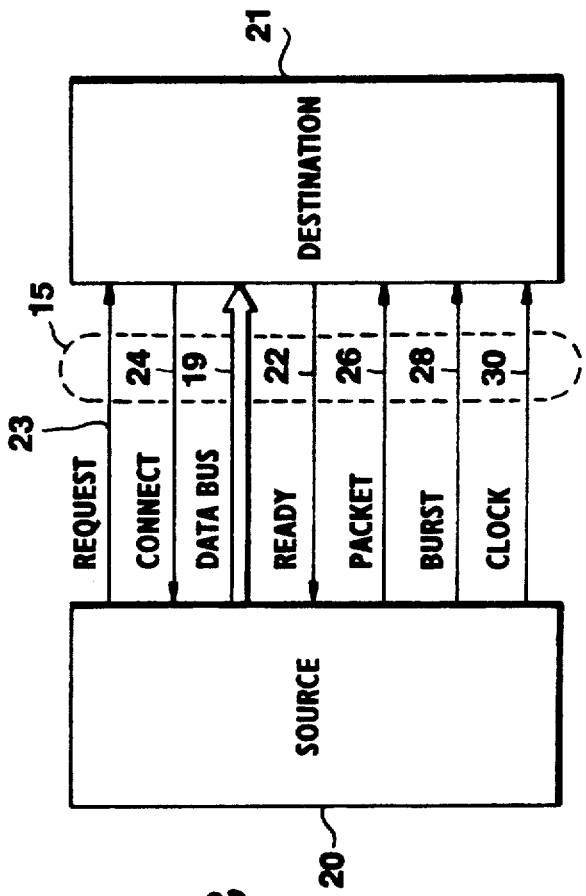
FIG. 2 is an electrical diagram of a data communication channel used in the embodiment of FIG. 1.
Figure 3:
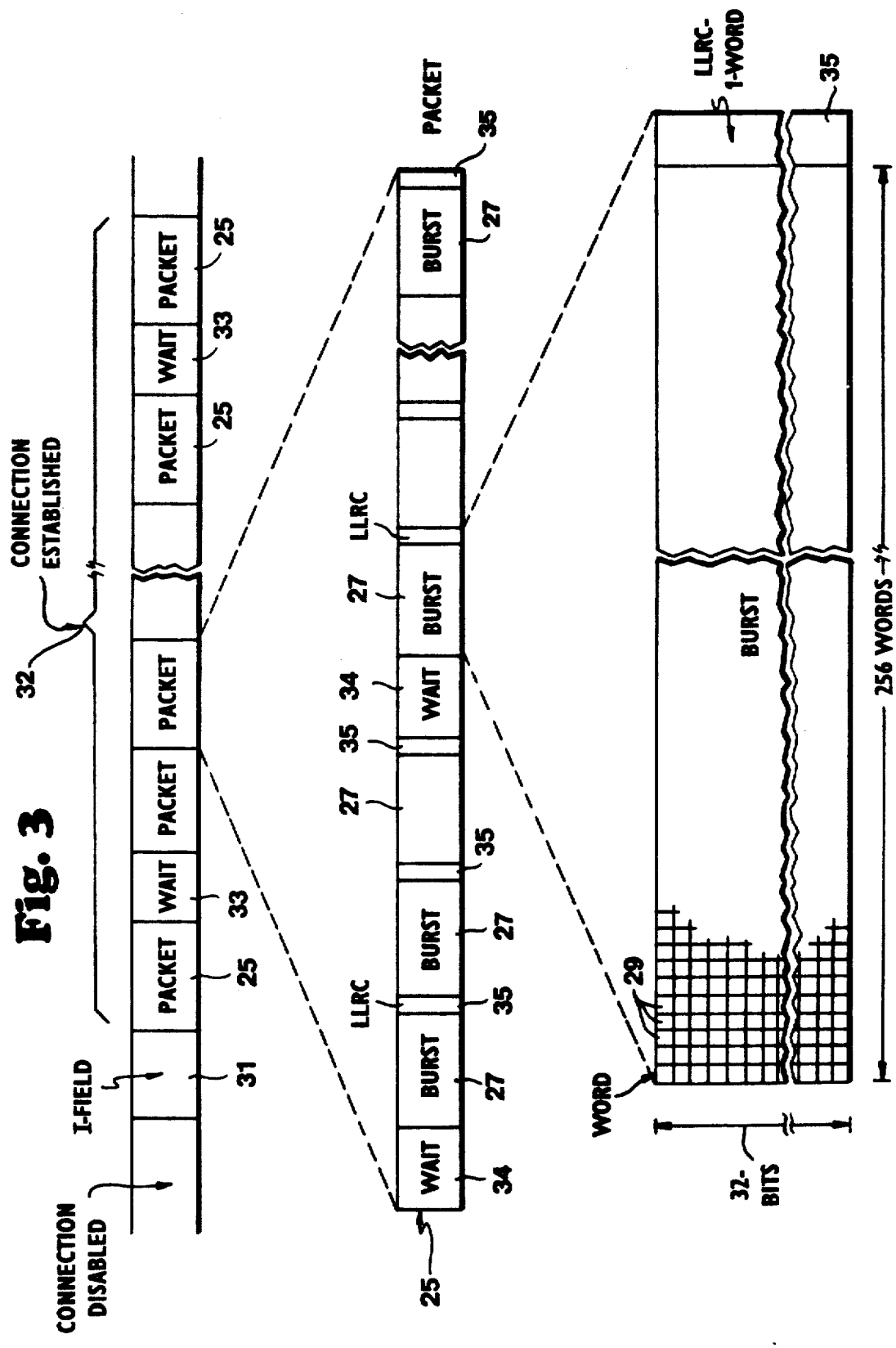
FIG. 3 is a timing diagram of a message frame used in the data communication system of FIGS. 1 and 2, in one embodiment.

Referring to FIG. 2, the parallel interface used for each of the paths 15-18 contains thirty-two data lines 19 connected from the source 20 to the destination 21. Each source and destination of FIG. 2 is one of the nodes at either end of any one of the paths 15-18, e.g., the host 13 and the crossbar interface 11 may be this source and destination. When the source node 20 wants to send data to the destination node 21, first it asserts a Request on line 23. The destination node then asserts the Connect signal on line 24 whenever it accepts the request for connection. When buffers become available at the destination, the destination asserts one or more Ready indications on line 22. When the source receives a Ready indication it can then assert Packet on line 26 and Burst on line 28 to send packets and bursts in a format as shown in FIG. 3. After a connection is established, a number of packets 25 may be sent, with each packet being delimited by the source 20 asserting a Packet line 26. Within each packet 25, data is in bursts 27, each burst being delimited by the source asserting a Burst line 28 in the parallel interface. Within a burst 27, ordinarily there are 256 32-bit data words 29, one word 29 being sent during each clock period defined by a 25-Mhz clock (40-nsec period) sent by the source 20 on a clock line 30 (bursts of less than 256 words 29 are also possible, but will not be treated here). The source asserts Request on line 23 whenever it attempts to connect with the destination. Whatever is on the data lines 19 between the time Request is sensed or felt at the destination and the time that the destination asserts Connect on line 24, is called I-field data. The destination may or may not use this data. While the signals Request and Connect remain asserted, a period 32 of "connection established" state follows the information field 31, during which the number of packets 25 as defined by the source 20 can be sent. The first burst of a packet contains information such as destination address, source address, type of message, priority, length of message in number of packets, etc., depending upon the protocol being executed. During the connection-established period 32, wait periods 33 may be inserted between packets 25 when the destination 21 is not ready to accept data or the source not ready to send, and likewise during a packet 25 the bursts 27 may be separated by wait periods 34 when the destination or source is not ready. In one clock period following each burst 27 a check word 35 is sent by the source 20 on the data bus 19; although various types of checking might be used, the parallel interface of the standard protocol employs LLRC or length/longitudinal redundancy checkword. Parity bits are also sent on lines parallel with the data lines 19, and additional control lines used to signal a wire connection, but these elements (LLRC, parity and added controls) will be omitted in the description below for simplicity.

A crossbar interface 11 or 12 stores and forwards data between a host 13 or 14 and the crossbar switch 10. In addition to buffering data, the crossbar interface provides the host computer with an intelligent interface into a network. The crossbar interface 11 or 12 is a programmable platform for intelligent control of the crossbar switch, and has the capability of standardizing and simplifying the host computer's interface into the crossbar network. The software run by the host computer needs minimal changes to adapt to the network. Routing, connections, synchronization, network management and network protocol processing are handled by the crossbar interface 11 or 12 rather than by the host. Communications between crossbar interfaces 11 and 12 are handled by sub-network protocols running among crossbar interfaces; the host computers 13 and 14 do not directly participate in sub-network transmissions. Standard host network protocols and messages communicate "on top of" the underlying network provided by the crossbar interfaces and crossbar switch. Applications and network layers running on the host computers communicate with their peer layers running on other hosts within the network, unaware of the activity of the crossbar interfaces and crossbar switching. The crossbar interface 11 or 12 thus performs six basic functions on behalf of the host computer: data buffering, protocol processing, routing, connection management, physical synchronization and network management. As a data buffer, the crossbar interface stores associated blocks of data (packets in this case) to allow the protocol processor to access the data for the purposes of interrogation and modification. The logic executed by the protocol processor decides whether a packet should be retransmitted or handled in some other way.

Figure 4A:
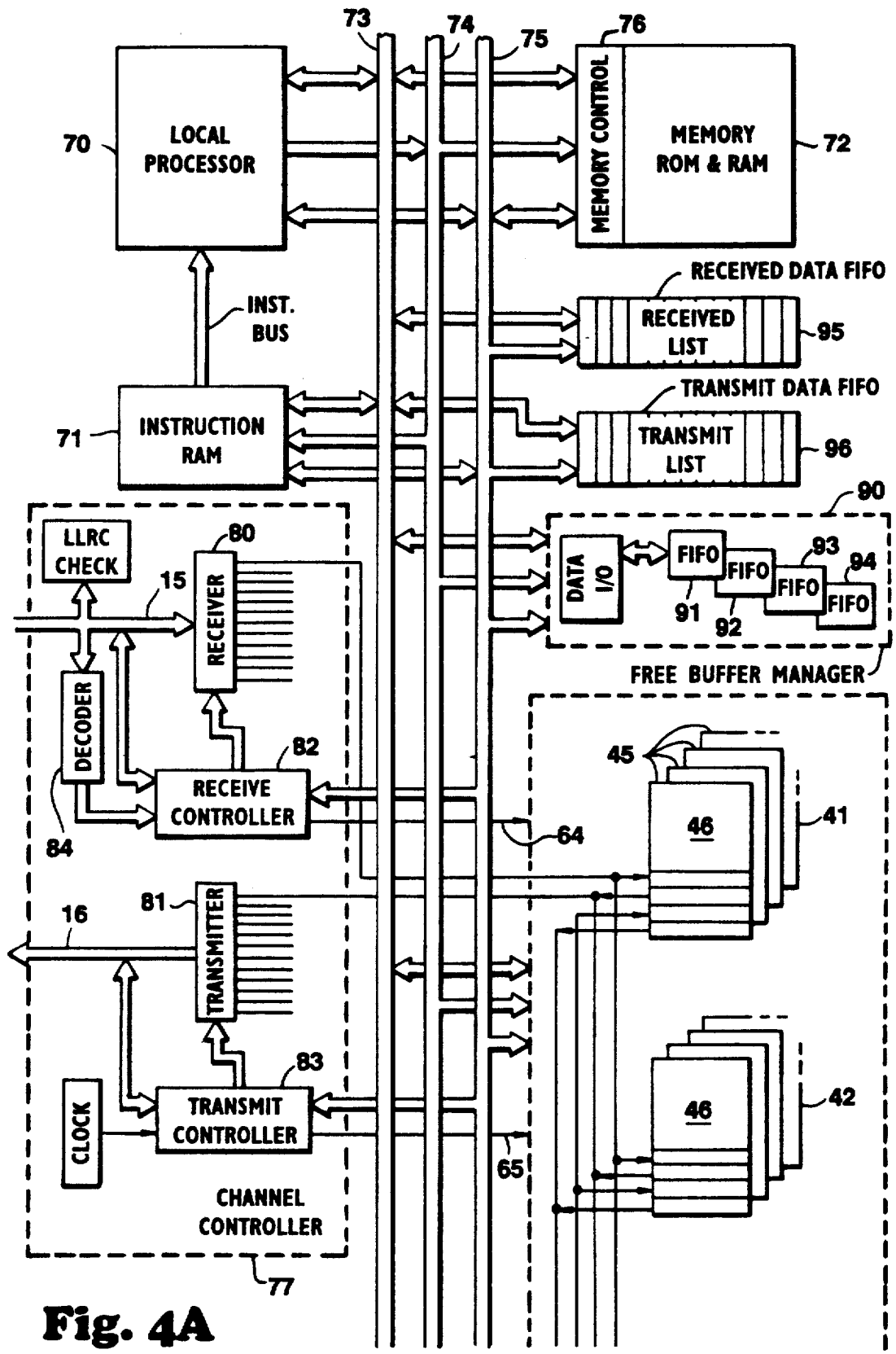
FIG. 4, consisting of FIGS. 4A and 4B, is an electrical diagram in block form of a crossbar interface used in the embodiment of FIG. 1.
Figure 4B:
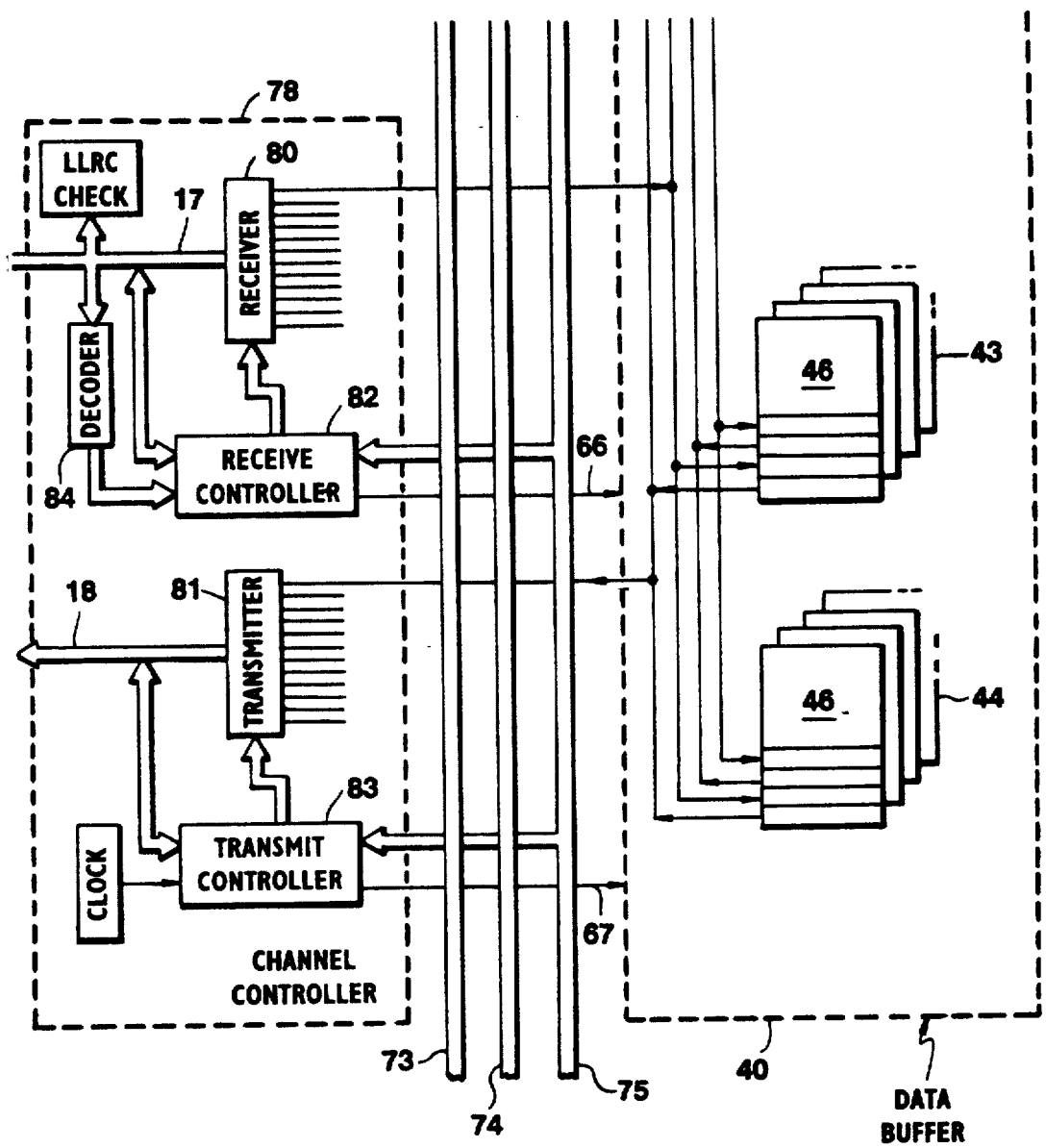
Figure 5:
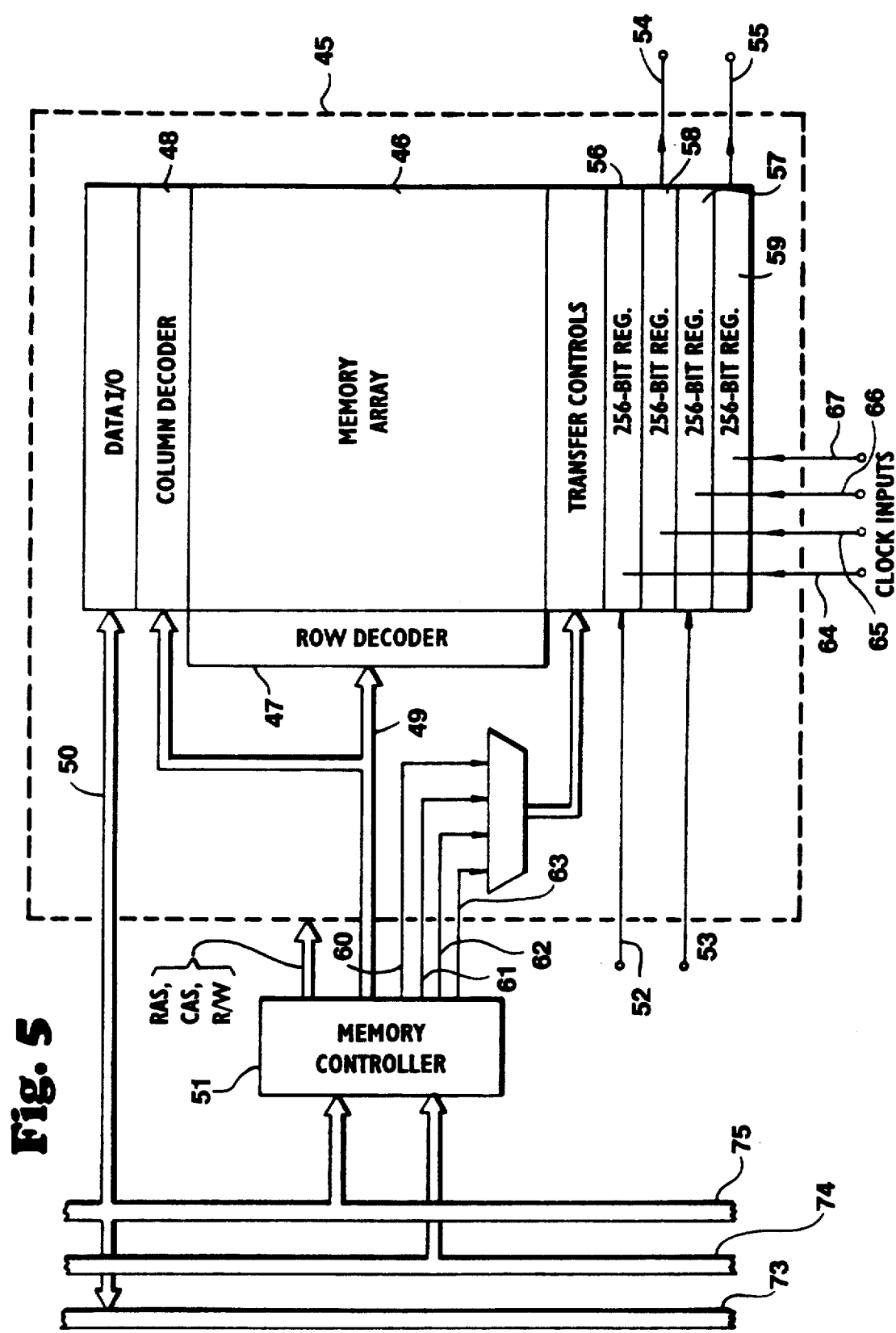
FIG. 5 is an electrical diagram in schematic form of a three-port memory device used in the crossbar interface of FIG. 4.

Referring to FIG. 4, one of the crossbar interfaces 11 (or 12) is shown according to one embodiment of the invention. The crossbar interface employs a multiple-port DRAM arrangement for a data buffer memory 40. Four banks 41, 42, 43 and 44 of multiple-port DRAMs are employed in this embodiment, with each bank having thirty-two memory chips 45, each chip being a 64K-bit device. In FIG. 5, one of the multiple-port DRAM chips 45 is shown in more detail. Each memory chip 45 of a bank 41-44 includes a random access array 46 of dynamic memory cells which is accessed in the random access mode by row address and column address decoders 47 and 48 receiving a multiplexed address on address lines 49. The random-access data I/O is on line (or lines) 50; the DRAMs may be of the by-1, by-2, by-4, by-8 or other such data I/O structure. A memory controller 51 generates the RAS and CAS strobes and R/W signals as is the usual practice for driving DRAMs. The random-access part of the DRAM chips 45 is of conventional construction. For the serial ports, however, the memory chip 45 is constructed as set forth in U.S. Pat. No. 4,851,834, issued to Stockebrand et al, assigned to Digital Equipment Corporation; this construction is similar to a so-called video DRAM. Each memory chip 45 has two separate serial input ports 52 and 53 and two separate serial output ports 54 and 55. The serial input ports 52 and 53 are each coupled to one bit of the 32-bit data bus 19 of one of the parallel paths 15 or 17 to receive the data sent to the crossbar interface 11 from the host computer or crossbar switch. Likewise, each one of the serial output ports 54 or 55 is coupled to one bit of one of the 32-bit data bus 19 of one of the parallel outgoing paths 16 or 18 to provide transmit data. The input ports 52 and 53 are each connected respectively to a shift register 56 or 57 (256 bit registers in the example embodiment), and likewise the output ports 54 and 55 are coupled respectively to shift registers 58 and 59. Each input shift register 56 or 57 may be loaded in parallel (in one memory cycle time) to a row of the DRAM cell array 46 by a transfer signal applied to a control line 60 or 61, with the row to be loaded being selected by a row address simultaneously applied to the row decoder 47 at the time the transfer signal is asserted on the line 60 or 61. In a like manner, a row (256 bits) of the DRAM array may be loaded in parallel (in one memory cycle) to one of the output shift registers 58 or 59 by a transfer control signal on a control line 62 or 63, with the row being selected by a row address simultaneously applied to the row decoder 47 (along with appropriate RAS and R/W controls). The registers 56–59 are referred to as shift registers, but each of these actually may be a static register having an address pointer to one bit which shifts each time the register is clocked, so the data in the register is loaded or unloaded one bit at a time even though the data does not shift from stage to stage at each clock cycle. The four shift registers 56–59 are separately and asynchronously clocked by channel clock inputs 64, 65, 66 and 67 (corresponding to the clock line 30 of FIG. 2 from each channel), so data can be clocked in to the register 56 at the clock rate of the path 15 while at the same time data is being clocked out of the register 58 at the clock rate of the path 18, for example. Meanwhile, during the period of 256 clock cycles for the serial loading or unloading of the registers 56–59, the cell array 46 can be accessed by the data I/O port 50 using 256 random access cycles (RAS, CAS cycles) if needed. Thus, a large portion of the time is available for protocol processing, which would not be true if incoming and outgoing message data had to share the random access port with access for protocol processing. Each of the shift registers 56–59 of the thirty-two chips 45 in a bank 41, 42, 43 or 44 holds one bit of the 32-bit parallel input paths 15 and 17 or output paths 16 and 18, so that each 256-bit shift register 56, 57, 58 or 59 handles one burst 27 of the message frame of FIG. 3 in a sequence of serial load or unload and parallel transfer to or from the array 46.

The "ownership" of control of the sets of shift registers 56–59 in the one-hundred and twenty-eight memory chips 45 in the banks 41, 42, 43 and 44 is passed back and forth between the channel controllers (i.e., the controllers of the paths 15–18) and the controller of the crossbar interface 11. This controller of the crossbar interface is a processor 70 of FIG. 4, executing code from an instruction RAM 71 and also accessing a main memory 72 containing ROM and RAM. The processor may be an AMD 29000 microprocessor, for example, which is a RISC processor having a large register set of 192 registers so delays for memory access are minimized. Of course, various other high-performance microprocessors can be used as the protocol processor 70. The processor 70 accesses the memories 71 and 72, as well as the buffer memory 40 (random access mode), by a 32-bit data bus 73 and an address bus 74, along with a control bus 75. A memory controller 76, as well as the memory controller 51 mentioned above, may be employed, as is the usual practice. The buffer memory 40

(random access mode) is thus part of the address space of the processor 70, but is also accessed by the serial ports using the shift registers. The multiple-port DRAMs of the buffer memory 40 thus provide synchronization between three independent asynchronous busses, i.e., the system bus 73, 74, 75, the input channel 15 (or 17) and the output channel 16 (or 18).

The crossbar interface 11 of FIG. 4 includes a channel controller 77 for the receive and transmit paths 15 and 16 to and from the host computer 13, and another channel controller 78 for the channel to and from the crossbar switch 10. Each of the channel controllers 77 and 78 has a data path including a 32-bit parallel data receiver 80 and a 32-bit parallel data transmitter 81, along with a receive control circuit 82 and a transmit control 83 which may be state machines receiving and generating the control lines of FIG. 2 as well as control fields derived from the data lines 19 by a decoder 84; in addition, of course, the control circuits 82 and 83 receive control signals from the local processor 70 via busses 73, 74 and 75, and can generate control signals going to the processor 70, such as interrupts. Each of the receivers 80 provides thirty-two outputs going to the inputs 52 or 53, with selection of which bank being made by a selector which receives a bank select field written from the processor 70. The clock from line 30 of the channel is received by the control circuit 82 and routed to the appropriate shift registers by lines 64-67. Since the channel controllers 77 and 78 should respond in one cycle time to some controls contained in fields of the data word on the data lines 19, the decoder 84 receives these data lines directly from the channel. The receiver 80 produces an output directly to the data bus 73, and the data bus 73 can write directly to the transmitter 81 for some commands, as in the I-field 31.

Each of the rows of memory cells in the cell arrays 46 in the banks 41, 42, 43 and 44 of DRAMs 45 corresponds to a potential site for storing a burst 27, and these sites (numbering 1024) must be allocated for incoming data and then deallocated for transmitted data. The processor 70 performs this task, producing an address on the bus 74 to be asserted on row address inputs 49 when the transfer signal on line 60 or 61 is asserted to capture a received burst just clocked into one of the registers 56 or 57, and likewise producing an address when the transfer line 62 or 63 is asserted for a burst that is to be transmitted from one of the registers 58 or 59. In the example, the buffer 40 can hold 1024 bursts 27 at any given time, so a number of different packets 25 for a number of different connection-established events 32 could be present in the buffer. Upon power-up, the bursts 27 of a packet may be stored in contiguous, sequential rows of a bank of the DRAM arrays 46, but after operating for a while the buffer memory 40 will become fragmented, with the bursts 27 within a packet 25, and the packets 25 themselves, located at randomly dispersed rows or sequences of rows. This is because the protocol executed by the processor 70 need not necessarily transmit the packets in the same order that they are received. The packets are not passed on downstream until the destination is ready to receive and a path can be established, so a later-received packet may be transmitted before an earlier-received packet. These packets 25 are of arbitrary number of bursts 27. Rows still holding packets 25 blocked from retransmission, waiting for decisions from higher level protocols, occupy memory space, interspersed with "holes" from packets which have been deleted (deallocated) upon retransmission. The buffer memory 40 thus becomes fragmented.

To manage the buffer memory 40, a scatter gather mechanism is provided by a free buffer manager 90 accessed by the processor 70 via the busses 73 and 76. The free buffer manager 90 is a set of four FIFOs 91, 92, 93 and 94 (one for each bank 41, 42, 43 and 44) used to hold the queue of row addresses of available buffer memory. At system initialization, an incrementing data pattern is loaded into each of the FIFOs 90-94, indicating all of the 256 row addresses in each bank are available, and the row addresses at this time are in a regular ascending (or descending) order. Each data location in the FIFOs 91-94 represents a physical row address in the buffer memory 40. In the example, the memory chips 45 in each bank are 256-rows deep, so there are 1024 possible locations for a burst of receive data. Each one of the FIFOs 91, 92, 93 and 94 is a 256×8 memory device, but an address for one of the locations is carried on the data bus 73 by a data word containing the 8-bit address to be stored in the 8-bit wide FIFO plus a 1-of-4 field defining which bank 41, 42, 43 or 44 is to be used; the other information carried on the 32-bit bus 73 for a free buffer manager operation is a "valid" bit indicating whether the location is free or not. Thus, when a buffer memory 40 location (row and bank address) is stored in a register of the processor 70 or its memory 71, etc., it carries a valid bit indicating free or not. This location is referred to as a "burst data descriptor". As the packets arrive on input channels 15 and 17, the buffer locations (burst data descriptors) are removed from the FIFOs 91, 92, 93 and 94 by the processor 70 as it allocates space for bursts, then when bursts are transmitted on to the next node the locations (descriptors) are written back to the FIFOs 91, 92, 93 and 94 by the processor 70.

An ordered list of burst data descriptors represent a packet's data in buffer memory 40. A received packet is stored in the buffer memory 40 in a set of row/bank locations as established when the burst data descriptors are taken from the free buffer manager 90, and this set is then stored in a received data FIFO 95. A burst data descriptor is written to the received list 95 each time a burst 27, received in a shift register 56 or 57, has been written to a row of buffer memory 40. Packet end, error status and other information bits are OR'ed into the burst data descriptor before writing it to the received list 95. Control of a row in buffer memory 40 is passed from the receiver process to the protocol process by writing the burst data descriptor to the received list 95. Then, when the protocol has finished its processing of the data, the burst data descriptor is read from the received list 95 and written to a transmit list 96. The transmit list is a list of the rows in buffer memory 40 waiting to be loaded into an outgoing shift register 58 or 59 and transmitted on a channel 16 or 18. After a row is transmitted, its burst data descriptor is deleted from the transmit list 96 and written to the free buffer manager 90 in the appropriate FIFO 91-94 defined in the bank field of the descriptor.

The process which writes burst data descriptors to the received list 95 is a real-time process. It must write the shift register 56 or 57 data to the buffer memory array 46 and collect any status before status registers change. It is also important to quickly allocate the next memory row (for the next burst) and to signal the channel controller 82 or 83 to issue a flow control signal (the Ready signal on line 22) to allow the next burst 27 to be sent. A Ready signal must not be issued if memory allocation fails, i.e., if a row is not available from the free buffer manager 90 and the burst data descriptor formed. The time to signal a Ready is dependent upon the time for memory allocation and verification of success.

Once the burst buffer descriptor has been written to the received list 95, a background process executed by the processor 70 reads the burst buffer descriptors from the list 95 and does protocol processing. All realtime information that was available is indicated in the burst buffer descriptor that was passed to the background process. The background process can be blocked by realtime events without risk of loosing track of burst status or address information since it is all in the burst buffer descriptor.

The burst buffer descriptor of the last burst in a packet 25 is marked with a "packet end" flag. From the initial state, the first burst buffer descriptor into the received list 95 must be the first burst 27 in a packet 25. Subsequent burst buffer descriptors in the received list 95 represent the "middle" bursts 27 in the packet. Once the background process reads the burst buffer descriptor with the packet end flag set, it knows that this is the end of the packet 25 and that the next burst buffer descriptor read must represent the start of a new packet.

Finally, the list of burst buffer descriptors is written to the transmit list 96 and the transmit processor deallocates the burst buffer descriptor after sending the burst.

Figure 8:
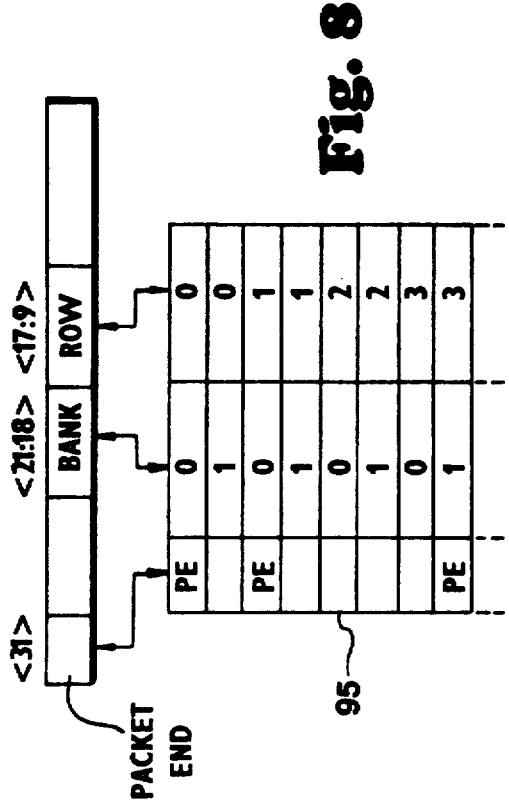
FIG. 8 is a diagram of the received list in the crossbar interface of FIG. 4, after the system has been running for a short while following initialization of the system.
Figure 9:
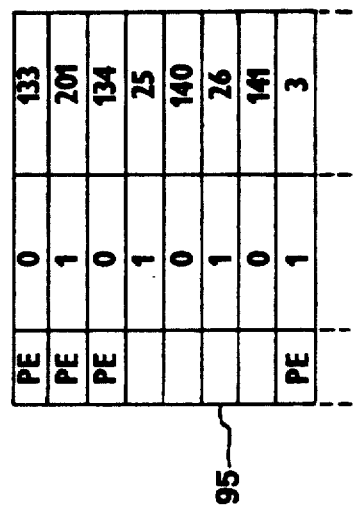
FIG. 9 is a diagram of the received list of FIG. 8 after the system has been in operation long enough so that the order of addresses is no longer contiguous.
Figure 6:
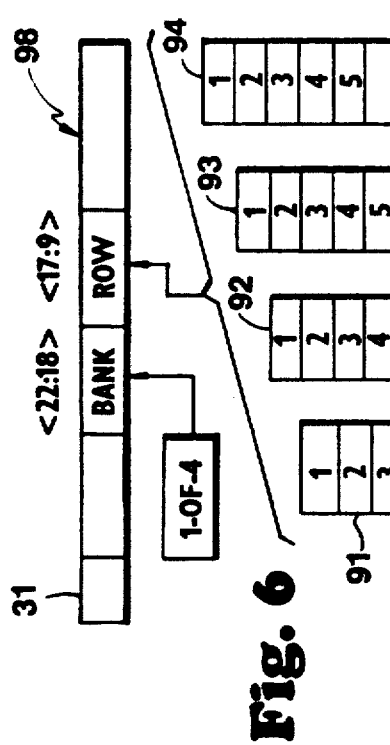
FIG. 6 is a diagram of a free buffer manager used in the crossbar interface of FIG. 4, upon initialization of the system.
Figure 7:
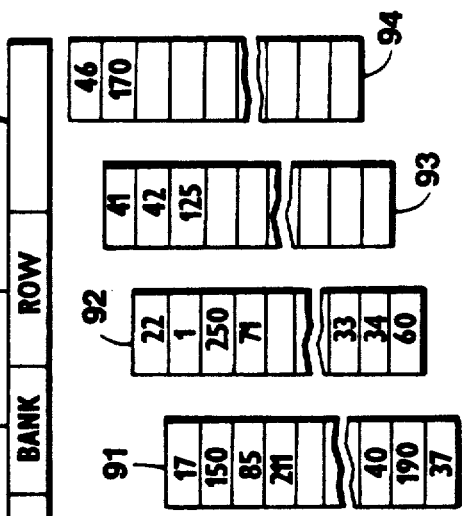
FIG. 7 is a diagram of the free buffer manager of FIG. 6 after the system has been in operation for a while and the order of addresses is no longer contiguous.

Referring to FIG. 6, the free buffer manager 90 is shown in an initialized state where the FIFOs 91-94 are each loaded with sequential ascending address 1-to-256. The data word 97 on the bus 73 when the processor 70 is loading the free buffer manager upon initialization includes a field at bits <17:9> defining the row address and a field at bits <22:18> defining the bank; the row information is loaded directly to the next location in the FIFO which is addressed as an I/O location by the processor 70, in the bank defined in the bank field. The data word 98 output to the bus 73 from the free buffer manager 90 is also seen in FIG. 6, and has the same fields for row address and bank as in the input word 97, again addressed by the processor 70 as an I/O location. In addition, the word uses bit <31> as the "valid" bit, as previously discussed. Referring to FIG. 7, after the system has been in operation for some time, the row addresses in the FIFOs 91-94 are no longer sequential but instead are randomly dispersed. Thus when bursts of a new packet are loaded to the buffer memory, the rows used to store the series of bursts will be in no regular order, merely in the order appearing in the free buffer manager. Likewise, the first incoming packets will have their burst buffer descriptors loaded to the received list 95 in a regular order as seen in FIG. 8, which shows the first few bursts to be loaded soon after initialization. A burst descriptor is written to the received list by the interrupt service routine which is invoked after a burst is received. After the system has been in operation for some time the order of row data is no longer physically contiguous in the received list as seen in FIG. 9. In the received list, bit <31> is the packet-end indication, and fields <17:9> and <21:18> are row and bank as before.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A data communication system comprising:
    a) a plurality of processor nodes, each having a data channel;
    b) a crossbar switch having a plurality of ports;
    c) a plurality of interface units, each one of said interface units including:
        i) receive and transmit data ports included as part of said one of said interface units and coupled to said data channel of one of said processor nodes and one of said ports of said crossbar switch;
        ii) a multiple-port buffer memory included as part of said one of said interface units and having a random-access port accessing a memory array, and having a plurality of serial-access ports and a plurality of serial registers, each one of said serial-access ports accessing one of said serial registers, and means for transferring data between said serial registers and said memory array, said serial access ports being coupled to said receive and transmit data ports;
        iii) a local processor included as part of said one of said interface units and accessing said random-access port of said buffer memory;
        iv) an address store for said buffer memory accessed by said local processor and containing lists of free locations in said buffer memory, locations of received data, and locations of data ready to transmit.

2. A system according to claim 1 wherein data is clocked into said serial-access ports asynchronously.

3. A system according to claim 1 wherein said serial-access ports have parallel data conductors and there is a separate one of said serial registers for each of said data conductors.

4. A system according to claim 3 wherein data is transferred on said channels in packets containing a plurality of bursts, each of said serial registers having a number of bits at least as great as the number of bits in a burst.

5. A system according to claim 1 wherein said plurality of serial registers includes at least one receive-data register having an input coupled to said receive-data port and clocked at a first clock rate, and includes at least one transmit-data register having an output coupled to said transmit-data port and clocked at a second clock rate asynchronous to said first clock rate, said local processor accessing said memory array during said clocking of said receive-data and transmit-data registers.

6. A method of moving data at an interface in a communications network, the network having a plurality of nodes, comprising the steps of, at said interface:
    a) receiving, from one of said nodes, a data block at a receive-data port of said interface and moving said data block into a serial register at a first clock rate defined by said receive-data port;
    b) transferring said data block to location in a buffer memory array in said interface defined by a free-buffer address, and holding said data block in said buffer memory array until the data block is to be transmitted from the interface;
    c) accessing said data block at a random-access port of said buffer memory array by a local processor in said interface, said accessing changing a part of said data block;
d) thereafter transferring said data block from said location into another serial register in said interface;
e) transmitting said data block from said interface toward another of said nodes by moving said data block from said serial register to a transmit-data port of said interface at a second clock rate asynchronous to said first clock rate.

7. A method according to claim 6 including the step of maintaining in said interface by said local processor a store of addresses of locations in said buffer memory array which do not contain a valid data block to thereby provide said free-buffer address.

8. A method according to claim 6 wherein said step of accessing said data block is at a third clock rate asynchronous with said first and second clock rate.

9. A method according to claim 6 including the step of maintaining in said interface by said local processor in a received-list store a list of addressees for said buffer memory for blocks of received data.

10. A method according to claim 6 including the step of maintaining in said interface by said local processor in a transmit-list store a list of addressees for said buffer memory for blocks of data ready to transmit.

11. A method according to claim 6 wherein said receive data port includes parallel data conductors, and said transmit port includes parallel data conductors, and said buffer memory includes a memory array and said serial registers for each of the data conductors.

12. An interface device for transferring data in a communications network, comprising:
a) a data receiver coupled to a receive data port to receive blocks of data transmitted on a first channel and receiving a first clock signal from said first channel;
b) a transmitter coupled to a transmit data port to transmit blocks of data on a second channel and sending a second clock signal on said second channel;
c) a multiple-port buffer memory including a memory array and a plurality of serial registers, and having a random-access port accessing said memory array, and having a plurality of serial-access ports each accessing one of said serial registers and coupled to said receive or transmit data ports for either receiving or transmitting said blocks of data, said serial-access ports being asynchronously clocked by said first and second clock signals independently of said random-access port, each of said serial registers being coupled to said memory array by coupling means for transfer of data in parallel to and from said serial registers, blocks of data being transferred by said coupling means between said serial registers of said serial-access ports and said memory array;
d) a local processor accessing said random-access port of said memory.

13. A device according to claim 12 wherein said multiple-port memory is simultaneously accessible at said random-access port and said serial-access ports.

14. A device according to claim 12 wherein said local processor applies addresses to said buffer memory to identify locations for said transfer of data via said coupling means between said serial registers of said serial-access ports and said memory array.

15. A device according to claim 12 wherein said first and second channels are each parallel channels having multiple data paths and there are multiple ones of said buffer memories, one for each said data path.

16. A device according to claim 12 wherein said memory array is an array of rows and columns of memory cells, said serial registers contain a number of cells at least as great as the number of bits in a block of data in said receive data, and the number of columns of said memory array is at least as great as said number of cells of said serial register.

17. A device according to claim 12 including a free-buffer store holding the addresses of random-access locations which are free in said buffer memory, and one of said addresses is retrieved from said free-buffer store and applied to addressing means of said buffer memory when a block of data is transferred via said coupling means from a serial register to said memory array.

18. A device according to claim 17 including a receive-list store holding addresses of random-access locations is said buffer memory containing received data transferred from a serial register.

19. A device according to claim 18 including a transmit-list store holding addresses of random-access locations in said buffer memory containing transmit-data which is ready to transmit, and including means for transmitting said transmit-data via transferring said transmit-data from the memory array to a serial register by said coupling means and sending said transmit-data from said buffer memory by one of said transmit data ports.

20. A device according to claim 19 wherein said local processor accesses said free-buffer store, said receive-list store and said transmit-list store, and moves an address of a location in said buffer memory from said free-buffer store to said receive-list store when said a data block is received, and moves an address of a location from said receive-list store to said transmit-list store when a data block of said transmit-data is ready to transmit.

21. An interface device for transferring data in a parallel communications network, comprising:
a) a data receiver coupled to a receive data port to receive data transmitted on a first channel and receiving a first clock signal from said first channel, the first channel including a plurality of parallel data lines upon which data is sent in bursts of multiple words;
b) a transmitter coupled to a transmit data port to transmit data on a second channel and sending a second clock signal on said second channel, the second channel including a plurality of parallel data lines upon which data is sent in bursts of multiple words;
c) a multiple-port buffer memory including a memory array means and a plurality of serial register means, and having a random-access port accessing said memory array means, and having a plurality of serial-access ports each accessing one of said serial register means and coupled to said receive or transmit data ports for either receiving or transmitting said bursts of data, said serial-access ports being asynchronously clocked by said first and second clock signals independently of said random-access port, each of said serial-access ports including a plurality of parallel conductive paths to said serial register means, each of said serial register means being coupled to said memory array means by coupling means for transfer of data in parallel to and from said serial register means, bursts of data being transferred by said coupling means between said serial register means of said serial-access ports and said memory array means;

d) a local processor accessing said random-access port of said memory to execute protocol and processing functions on said bursts of data transferred to said memory array means.

22. A device according to claim 21 wherein said multiple-port memory is simultaneously accessible at said random-access port and said serial-access ports.

23. A device according to claim 21 wherein said local processor applies addresses to said buffer memory to identify locations for transfer of data via said coupling means between said serial register means of said serial-access ports and said memory array means.

24. A device according to claim 21 including a free-buffer store holding the addresses of random-access locations which are free in said buffer memory, and one of said addresses from said free-buffer store is applied to addressing means of said buffer memory to identify a location for transfer of a burst of data from said serial register means to said memory array means via said coupling means.

25. A device according to claim 24 including a receive-list store holding addresses of random-access locations in said buffer memory containing received data transferred from said serial register means.

26. A device according to claim 25 including a transmit-list store holding addresses of random-access locations in said buffer memory containing transmit-data ready to transmit, and means for transmitting said transmit-data by transferring said transmit-data by said coupling means from the memory array means to said serial register means.

27. A device according to claim 26 wherein said local processor accesses said free-buffer store, said receive-list store and said transmit-list store, said local processor moving an address of a given location in said buffer memory from said free-buffer store to said receive-data store when said received data has been transferred to said given location.

28. A device according to claim 21 wherein said memory array means includes a plurality of memory arrays, one for each one of said parallel data lines.

29. A device according to claim 28 wherein said serial register means includes a plurality of separate serial registers, one for each one of said parallel data lines.

30. A device according to claim 29 wherein said memory array means is a plurality of separate memory arrays of rows and columns of memory cells, said separate serial registers each contains a number of cells at least as great as the number of bits in a burst of data in said receive data, and the number of columns of each said memory array is at least as great as said number of cells of each said serial register.

31. A data communication system comprising:
a) first and second processor nodes interconnected by a parallel data channel, the parallel data channel including two one-way paths, each path including a separate set of a plurality of parallel data lines;
b) at least one interface unit intercepting said two one-way data paths in said parallel data channel between said first and second processor nodes, said interface unit including:
i) a receive data port and a transmit data port coupled to said first processor node, and a receive data port and a transmit data port coupled to said second processor node, said that said two one-way paths extend through said interface via said receive and transmit data ports;
ii) a multiple-port buffer memory including memory array means and serial register means, and having a random-access port accessing said memory array means, and having a plurality of serial-access ports each accessing said serial register means, each serial access port having a plurality of paths corresponding to said parallel data lines, and coupling means for transferring data between said serial register means and said memory array means, each one of said serial access ports being coupled separately to one of said receive and transmit data ports;
iii) a local processor accessing said random-access port of said buffer memory for executing protocol and other processing functions on data transferred to said memory array means by said serial register means.

32. A system according to claim 31 wherein data is clocked into said serial-access ports asynchronously.

33. A system according to claim 31 including an address store for said buffer memory accessed by said local processor and containing lists of free locations in said buffer memory, locations of received data, and locations of data ready to transmit.

34. A system according to claim 31 wherein data is transferred on said channel in packets containing a plurality of bursts, each of said serial register means having a number of bits at least as great as the number of bits in a burst.

35. A system according to claim 31 wherein said plurality of serial register means includes at least one receive-data register for each said path having an input coupled to said receive-data port and clocked at a first clock rate, and includes at least one transmit-data register for each said path having an output coupled to said transmit-data port and clocked at a second clock rate asynchronous to said first clock rate, said local processor accessing said memory array means during said clocking of said receive-data and transmit-data registers.

36. A system according to claim 31 including a crossbar switch intercepting said channel between said first and second processor nodes.

37. A data communication system comprising:
a) first and second processor nodes interconnected by a parallel data channel passing through a crossbar switch, the parallel data channel including two one-way paths, each path including a separate set of a plurality of parallel data lines; said crossbar switch intercepting said parallel data channel between said first and second processor nodes;
b) a pair of interface units in said parallel data channel, one of said interface units being connected between said first processor node and said crossbar switch and the other interface unit being connected between said second processor unit and said crossbar switch, each one of said interface units including:
i) a receive data port and a transmit data port coupled to said first processor node, and a receive data port and a transmit data port coupled to said second processor node;
ii) a multiple-port buffer memory including memory array means and a plurality of serial register means, and having a random-access port accessing said memory array means, and having a plurality of serial-access ports each accessing one of said serial register means, each serial access port having a plurality of paths corresponding to said parallel data lines, and coupling means connecting said serial register means to said memory array means for transferring data between said serial register means and said memory array means, each of said serial access ports being coupled separately to a different one of said receive and transmit data ports;

iii) a local processor accessing said random-access port of said buffer memory for executing protocol and other processing functions on data transferred to said memory array means by said serial register means.

38. A system according to claim 37 wherein data is clocked into said serial-access ports asynchronously.

39. A system according to claim 37 including an address store for said buffer memory accessed by said local processor and containing lists of free locations in said buffer memory, locations of received data, and locations of data ready to transmit.

40. A system according to claim 37 wherein data is transferred on said channel in packets containing a plurality of bursts, each of said serial registers having a number of bits at least as great as the number of bits in a burst.

41. A system according to claim 37 wherein said plurality of serial register means includes at least one receive-data register for each said path having an input coupled to said receive-data port and clocked at a first clock rate, and includes at least one transmit-data register for each said path having an output coupled to said transmit-data port and clocked at a second clock rate asynchronous to said first clock rate, said local processor accessing said memory array means during said clocking of said receive-data and transmit-data registers.

* * * * *